(12) United States Patent
Chilukuri et al.

(10) Patent No.: US 11,859,578 B2
(45) Date of Patent: Jan. 2, 2024

(54) THRUST REVERSER SYSTEM FOR AN AIRCRAFT PROPULSION SYSTEM

(71) Applicant: Rohr, Inc., Chula Vista, CA (US)

(72) Inventors: Radhakrishna Chilukuri, San Diego, CA (US); Ashok Babu Saya, Bangalore (IN); Hussain Mahamed Javed Tapadar, Bengaluru (IN)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/716,477

(22) Filed: Apr. 8, 2022

(65) Prior Publication Data
US 2022/0325679 A1    Oct. 13, 2022

(30) Foreign Application Priority Data
Apr. 8, 2021  (IN) .............................. 202111016590

(51) Int. Cl.
  *F02K 1/72* (2006.01)
  *F02K 1/62* (2006.01)
(52) U.S. Cl.
  CPC ................ *F02K 1/625* (2013.01); *F02K 1/72* (2013.01); *F05D 2240/129* (2013.01)
(58) Field of Classification Search
  CPC ....... F02K 1/72; F02K 1/625; F05D 2240/129
  See application file for complete search history.

(56) References Cited

U.S. PATENT DOCUMENTS

| | | | |
|---|---|---|---|
| 3,568,930 A | 3/1971 | Kuchar | |
| 7,484,355 B2 * | 2/2009 | Blin | F02K 3/04 60/230 |
| 8,096,501 B2 | 1/2012 | Marche | |
| 2013/0221124 A1 * | 8/2013 | Malecki | F02K 1/72 239/265.29 |
| 2015/0275766 A1 * | 10/2015 | Kohlenberg | F02K 1/06 415/122.1 |
| 2016/0245232 A1 | 8/2016 | Mackay | |
| 2017/0030296 A1 | 2/2017 | Dong | |
| 2020/0025141 A1 | 1/2020 | Gardes | |
| 2021/0207556 A1 * | 7/2021 | Czapla | F02K 1/763 |

OTHER PUBLICATIONS

Asbury Scott, C., and A. Jeffery Yetter. Static Performance of Six Innovative Thrust Reverser Concepts for Subsonic Transport Applications. NASA TM-2000-210300, pp. 1-369 (Year: 2000).*
EP Search Report for EP22167504.4 dated Dec. 8, 2022.

* cited by examiner

*Primary Examiner* — Ted Kim
(74) *Attorney, Agent, or Firm* — Getz Balich LLC

(57) ABSTRACT

A first cascade segment of a thrust reverser system has a first cascade segment flow area and is associated with a first lateral sector. A second cascade segment has a second cascade segment flow area and is associated with a second lateral sector. The second cascade segment flow area may be at least 1.2 times the first cascade segment flow area. The first lateral sector has a first leakage flow area and a first total flow area that is equal to a sum of at least the first cascade segment flow area and the first leakage flow area. The second lateral sector has a second leakage flow area and a second total flow area that is equal to a sum of at least the second cascade segment flow area and the second leakage flow area. The second total flow area may be within 10% of the first total flow area.

15 Claims, 12 Drawing Sheets

THRUST REVERSER SYSTEM FOR AN AIRCRAFT PROPULSION SYSTEM

This application claims priority to Indian Patent Appln. No. 202111016590 filed Apr. 8, 2021, which is hereby incorporated herein by reference in its entirety.

BACKGROUND

1. Technical Field

This disclosure relates generally to an aircraft propulsion system and, more particularly, to a thrust reverser system for the aircraft propulsion system.

2. Background Information

An aircraft propulsion system may include a thrust reverser system for producing reverse thrust during aircraft landing. Various types and configurations of thrust reverser systems are known in the art. One such thrust reverser system includes a plurality of blocker doors which are deployed to redirect an airflow within a bypass flow path into a thrust reverser duct. While such known thrust reverser systems have various benefits, there is still room in the art for improvement. There is a need in the art therefore for an improved thrust reverser system which, for example, can increase thrust reverser system efficiency.

SUMMARY OF THE DISCLOSURE

According to an aspect of the present disclosure, an assembly is provided for an aircraft propulsion system. This aircraft propulsion system assembly includes a forward thrust duct and a thrust reverser system. The thrust reverser system includes a thrust reverser duct, a blocker door assembly and a cascade structure. The blocker door assembly is configured to redirect fluid flowing through the forward thrust duct into the thrust reverser duct. The cascade structure includes a plurality of cascade segments within the thrust reverser duct. The cascade segments includes a first cascade segment and a second cascade segment. The first cascade segment has a first cascade segment flow area and is associated with a first lateral sector of the assembly. The second cascade segment has a second cascade segment flow area and is associated with a second lateral sector of the assembly. The second cascade segment flow area may be at least 1.2 times the first cascade segment flow area. The first lateral sector of the assembly has a first leakage flow area and a first total flow area. The first total flow area is equal to a sum of at least the first cascade segment flow area and the first leakage flow area. The second lateral sector of the assembly has a second leakage flow area and a second total flow area. The second total flow area is equal to a sum of at least the second cascade segment flow area and the second leakage flow area. The second total flow area may be within ten percent of the first total flow area.

According to another aspect of the present disclosure, another assembly is provided for an aircraft propulsion system. This aircraft propulsion system assembly includes a forward thrust duct and a thrust reverser system. The thrust reverser system includes a thrust reverser duct, a blocker door assembly and a cascade structure. The blocker door assembly is configured to redirect fluid flowing through the forward thrust duct into the thrust reverser duct. The cascade structure includes a plurality of cascade segments within the thrust reverser duct. The cascade segments include a first cascade segment and a second cascade segment. The first cascade segment has a first cascade segment flow area and is associated with a first lateral sector of the assembly. The second cascade segment has a second cascade segment flow area and is associated with a second lateral sector of the assembly. The second cascade segment flow area may be at least 1.5 times the first cascade segment flow area. The first lateral sector of the assembly has a first leakage flow area and a first total flow area. The first total flow area is equal to a sum of at least the first cascade segment flow area and the first leakage flow area. The second lateral sector of the assembly has a second leakage flow area and a second total flow area. The second total flow area is equal to a sum of at least the second cascade segment flow area and the second leakage flow area. The second total flow area may be within twenty percent of the first total flow area.

According to still another aspect of the present disclosure, another assembly is provided for an aircraft propulsion system. This aircraft propulsion system assembly includes a thrust reverser system. The thrust reverser system includes a thrust reverser duct and a plurality of blocker doors. The blocker doors are arranged circumferentially about an axial centerline. The blocker doors are configured to redirect fluid into the thrust reverser duct when in a deployed position. The blocker doors include a first blocker door, a second blocker door and a third blocker door. The first blocker door has a first configuration. The second blocker door has a second configuration that is different than the first configuration. The third blocker door has a third configuration that is different than the first configuration and the second configuration.

The first leakage flow area may be or otherwise include a first axial leakage flow area about the blocker door assembly. In addition or alternatively, the second leakage flow area may be or otherwise include a second axial leakage flow area about the blocker door assembly.

The first lateral sector of the assembly may also have a first radial leakage flow area about the cascade structure. The first total flow area may be equal to the sum of at least the first cascade segment flow area, the first axial leakage flow area and the first radial leakage flow area. In addition or alternatively, the second lateral sector of the assembly may also have a second radial leakage flow area about the cascade structure. The second total flow area may be equal to the sum of at least the second cascade segment flow area, the second axial leakage flow area and the second radial leakage flow area.

The first leakage flow area may be or otherwise include a first radial leakage flow area about the cascade structure. In addition or alternatively, the second leakage flow area may be or otherwise include a second radial leakage flow area about the cascade structure.

The second cascade segment flow area may be at least 1.4 times the first cascade segment flow area.

The second total flow area may be within eight percent of the first total flow area.

The first lateral sector of the assembly may circumferentially neighbor the second lateral sector of the assembly.

The cascade segments may also include a third cascade segment. The third cascade segment may have a third cascade segment flow area and may be associated with a third lateral sector of the assembly. The third lateral sector of the assembly may have a third axial leakage flow area about the blocker door assembly, a third radial leakage flow area about the cascade structure, and a third total flow area. The third total flow area may be equal to a sum of at least the third cascade segment flow area, the third axial leakage flow area and the third radial leakage flow area. The third total flow area may be within ten percent of the first total flow area.

The blocker door assembly may include a first blocker door and a second blocker door. The first blocker door may be within the first lateral sector of the assembly and may have a first configuration. The second blocker door may be within the second lateral sector of the assembly and may have a second configuration that is different than the first configuration.

The first blocker door and the second blocker door may be arranged about an axial centerline. The first blocker door may have a first shape when viewed in a plane perpendicular to the axial centerline. The second blocker door may have a second shape that is different than the first shape when viewed in the plane perpendicular to the axial centerline.

The first blocker door may have a first longitudinal length. The second blocker door may have a second longitudinal length that is different than (or equal to) the first longitudinal length.

The first blocker door may have a first lateral width. The second blocker door may have a second lateral width that is different than (or equal to) the first lateral width.

The first cascade segment and the second cascade segment may be arranged circumferentially about an axial centerline. The thrust reverser system may be configured to direct fluid out of the first cascade segment in a first circumferential direction about the axial centerline. The thrust reverser system may be configured to direct fluid out of the second cascade structure in a second circumferential direction about the axial centerline that is different than the first circumferential direction about the axial centerline.

The second cascade segment flow area may be at least 1.7 times the first cascade segment flow area. In addition or alternatively, the second total flow area may be within fifteen percent of the first total flow area.

The cascade segments may also include a third cascade segment. The third cascade segment may have a third cascade segment flow area and may be associated with a third lateral sector of the assembly. The third lateral sector of the assembly may have a third leakage flow area and a third total flow area. The third total flow area may be equal to a sum of at least the third cascade segment flow area and the third leakage flow area. The third total flow area may be within twenty percent of the first total flow area.

The second blocker door may be circumferentially between and may neighbor the first blocker door and the third blocker door. The first blocker door may have a first shape. The second blocker door may have a second shape that is different than (or the same as) the first shape. The third blocker door may have a third shape that is different than the first shape and/or the second shape.

The thrust reverser system may also include a cascade structure within the thrust reverser duct. The cascade structure may include a first cascade segment, a second cascade segment and a third cascade segment. The first cascade segment may be associated with the first blocker door and may have a first cascade segment flow area. The second cascade segment may be associated with the second blocker door and may have a second cascade segment flow area that is different than the first cascade segment flow area. The third cascade segment may be associated with the third blocker door and may have a third cascade segment flow area that is different than the first cascade segment flow area and/or the second cascade segment flow area.

The thrust reverser system may also include a blocker door assembly and a cascade structure within the thrust reverser duct. The blocker door assembly may include the first blocker door, the second blocker door and the third blocker door. The cascade structure may include a first cascade segment and a second cascade segment. The first cascade segment may have a first cascade segment flow area and may be associated with a first lateral sector of the assembly. The second cascade segment may have a second cascade segment flow area and may be associated with a second lateral sector of the assembly. The second cascade segment flow area may be at least 1.2 times the first cascade segment flow area. The first lateral sector of the assembly may have: a first axial leakage flow area about the blocker door assembly; a first radial leakage flow area about the cascade structure; and a first total flow area. The first total flow area may be equal to a sum of the first cascade segment flow area, the first axial leakage flow area and the first radial leakage flow area. The second lateral second of the assembly may have: a second axial leakage flow area about the blocker door assembly; a second radial leakage flow area about the cascade structure; and a second total flow area. The second total flow area may be equal to a sum of the second cascade segment flow area, the second axial leakage flow area and the second radial leakage flow area. The second total flow area may be within ten percent of the first total flow area.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
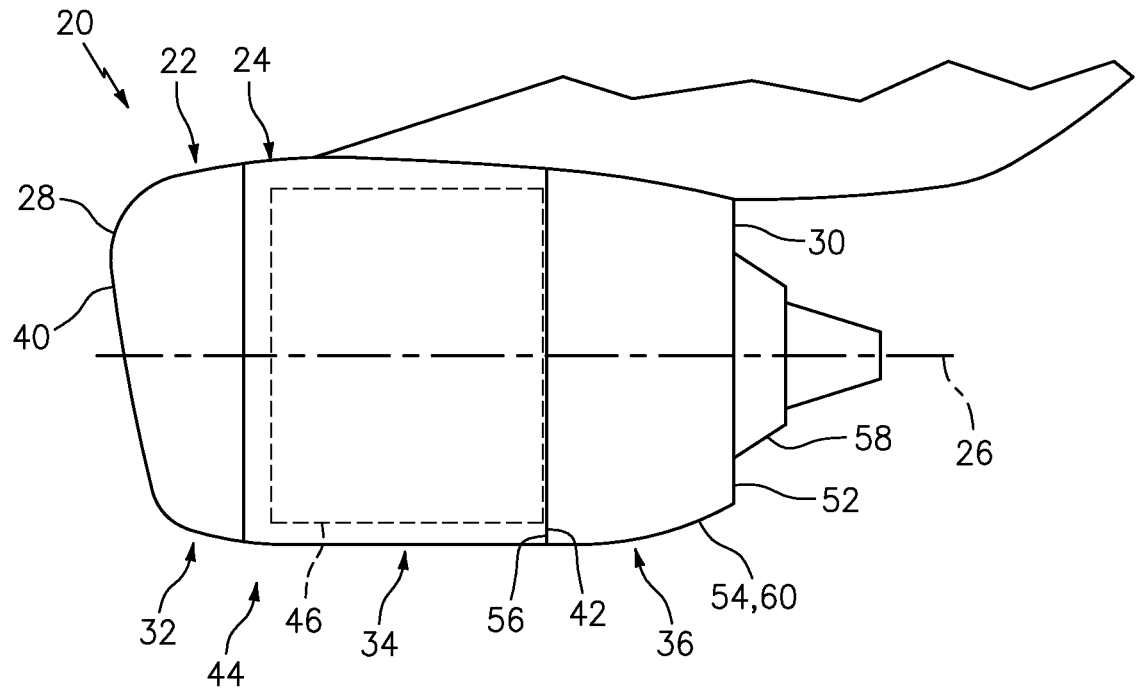
FIG. 1 is a side illustration of an aircraft propulsion system with a thrust reverser system in a stow configuration.

FIG. 1 illustrates an aircraft propulsion system 20 for an aircraft such as, but not limited to, a commercial airliner or a cargo plane. The propulsion system 20 includes a nacelle 22 and a gas turbine engine. This gas turbine engine may be configured as a high-bypass turbofan engine. Alternatively, the gas turbine engine may be configured as a turbojet engine or any other type of gas turbine engine capable of propelling the aircraft during flight.

The nacelle 22 is configured to house and provide an aerodynamic cover for the gas turbine engine. An outer structure 24 of the nacelle 22 extends axially along an axial centerline 26 (e.g., a centerline of the propulsion system 20, the nacelle 22 and/or the gas turbine engine) between a nacelle forward end 28 and a nacelle aft end 30. The nacelle outer structure 24 of FIG. 1 includes a nacelle inlet structure 32, one or more fan cowls 34 (one such cowl visible in FIG. 1) and a nacelle aft structure 36, which is configured as part of or includes a thrust reverser system 38 (see also FIG. 2).

The inlet structure 32 is disposed at the nacelle forward end 28. The inlet structure 32 is configured to direct a stream of air through an inlet opening 40 at the nacelle forward end 28 and into a fan section of the gas turbine engine.

The fan cowls 34 are disposed axially between the inlet structure 32 and the aft structure 36. Each fan cowl 34 of FIG. 1, in particular, is disposed at (e.g., on, adjacent or proximate) an aft end 42 of a stationary portion 44 of the nacelle 22, and extends forward to the inlet structure 32. Each fan cowl 34 is generally axially aligned with the fan section of the gas turbine engine. The fan cowls 34 are configured to provide an aerodynamic covering for a fan case 46.

Figure 3:
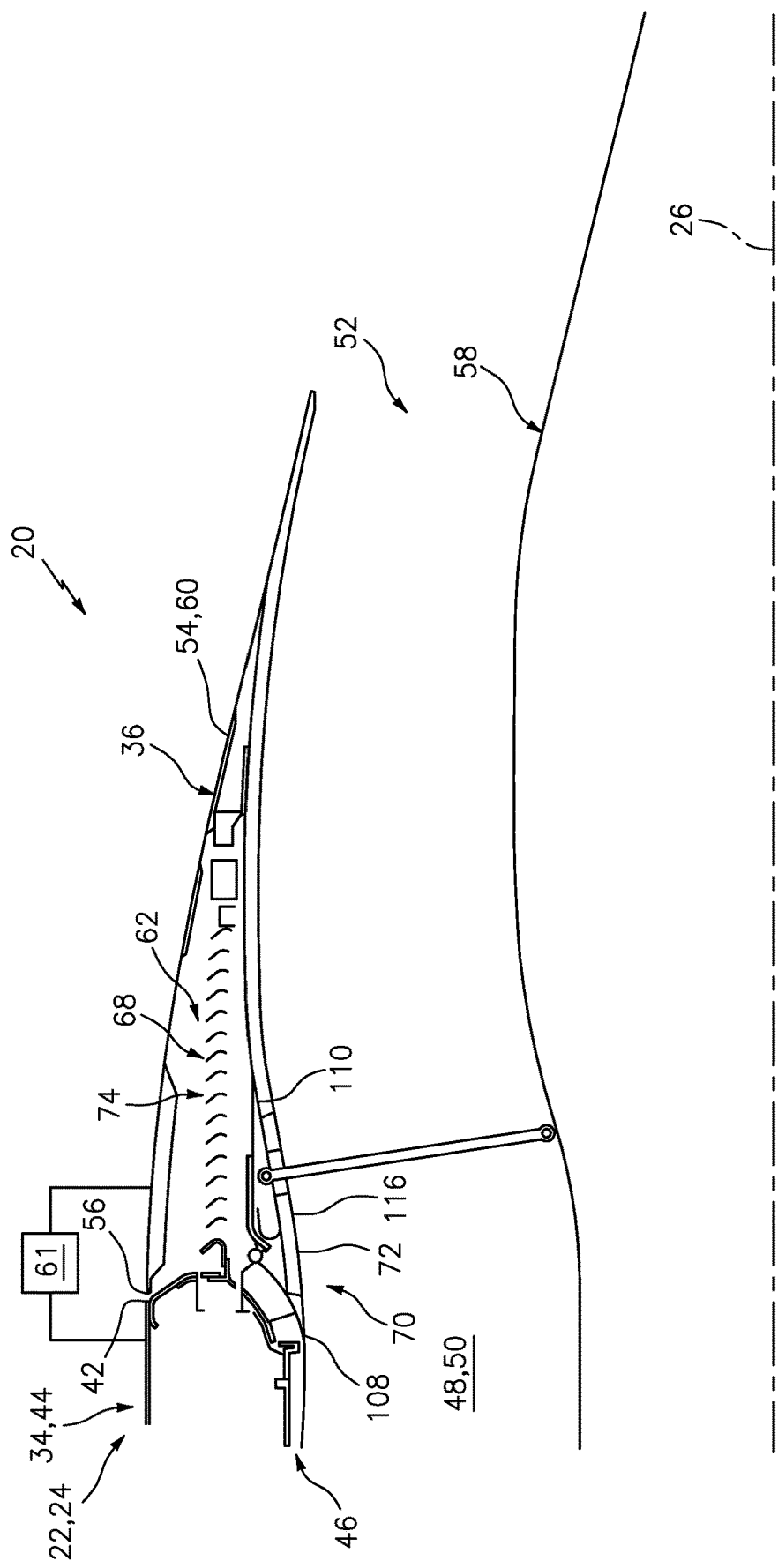
FIG. 3 is a partial side sectional illustration of an aft portion of the aircraft propulsion system with the thrust reverser system in the stow configuration.

Briefly, the fan case 46 extends circumferentially around the axial centerline 26 and thereby circumscribes the fan section. Referring to FIG. 3, the fan case 46 along with the nacelle 22 form a forward outer peripheral boundary of a forward thrust duct 48 of the propulsion system 20. In the embodiment of FIG. 3, the forward thrust duct 48 is configured as a bypass duct. The forward thrust duct 48 of FIG. 3, for example, at least partially or completely forms a bypass flowpath 50 within the propulsion system 20, which bypass flowpath 50 bypasses (e.g., flows around and/or outside of, not through) a core of the gas turbine engine to a bypass nozzle 52. Thus, during nominal propulsion system operation (e.g., when the thrust reverser system 38 is in its stowed configuration; see FIG. 3), the forward thrust duct 48 is configured to facilitate forward thrust for the propulsion system 20; e.g., direct fluid (e.g., fan/compressed air) out of the propulsion system 20 through the bypass nozzle 52 in an axially aft direction.

Referring again to FIG. 1, the aft structure 36 includes a translating sleeve 54 for the thrust reverser system 38. The translating sleeve 54 of FIG. 1 is disposed at the nacelle aft end 30. This translating sleeve 54 extends axially along the axial centerline 26 between a forward end 56 of the translating sleeve 54 and the nacelle aft end 30. The translating sleeve 54 is configured to partially form an aft outer peripheral boundary of the forward thrust duct 48 and its flowpath 50 (see FIG. 3). The translating sleeve 54 may also be configured to form the bypass nozzle 52 for the bypass flowpath 50 with an inner structure 58 of the nacelle 22 (e.g., an inner fixed structure (IFS)), which nacelle inner structure 58 houses the core of the gas turbine engine. Briefly, the turbine engine core typically includes a compressor section, a combustor section and a turbine section of the gas turbine engine.

The translating sleeve 54 of FIG. 1 includes a pair of sleeve segments 60 (e.g., halves) arranged on opposing sides of the propulsion system 20 (one such sleeve segment visible in FIG. 1). The present disclosure, however, is not limited to such an exemplary translating sleeve configuration. For example, the translating sleeve 54 may alternatively have a substantially tubular body. For example, the translating sleeve 54 may extend more than three-hundred and thirty degrees)(330° around the axial centerline 26.

Figure 2:
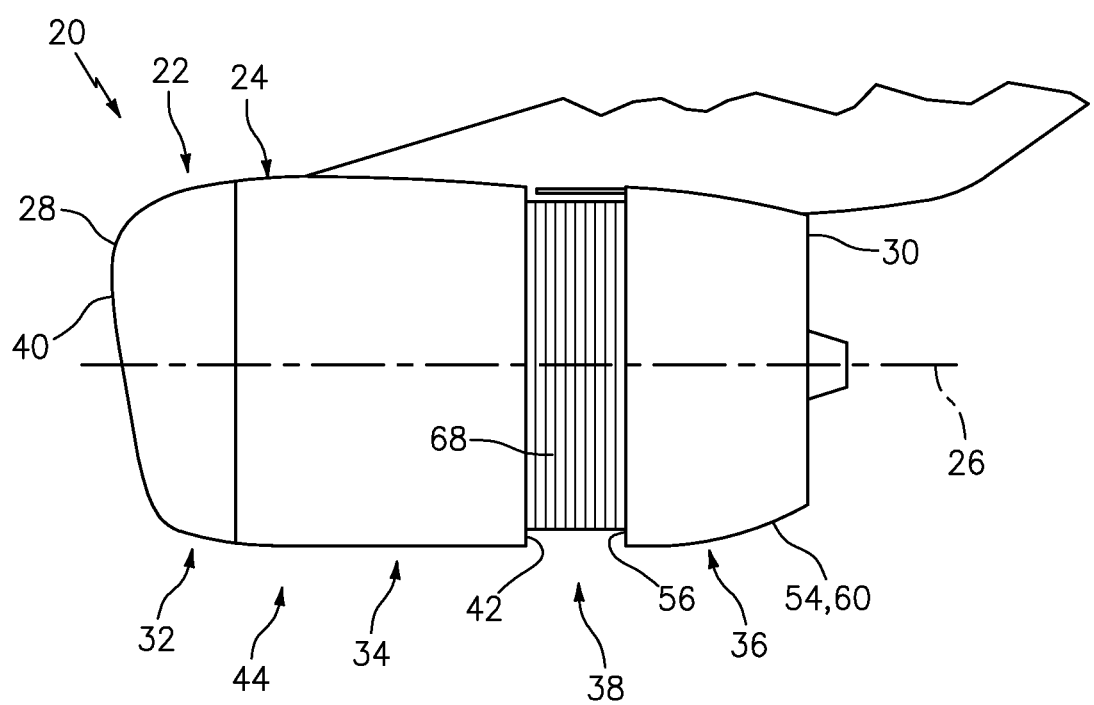
FIG. 2 is a side illustration of the aircraft propulsion system with the thrust reverser system in a deployed configuration.

Referring to FIGS. 1 and 2, the translating sleeve 54 is an axially translatable structure. Each translating sleeve segment 60, for example, may be slidably connected to one or more stationary structures (e.g., a pylon and a lower bifurcation) through one or more respective track assemblies. Each track assembly may include a rail mated with a track beam; however, the present disclosure is not limited to the foregoing exemplary sliding connection configuration.

Figure 4:
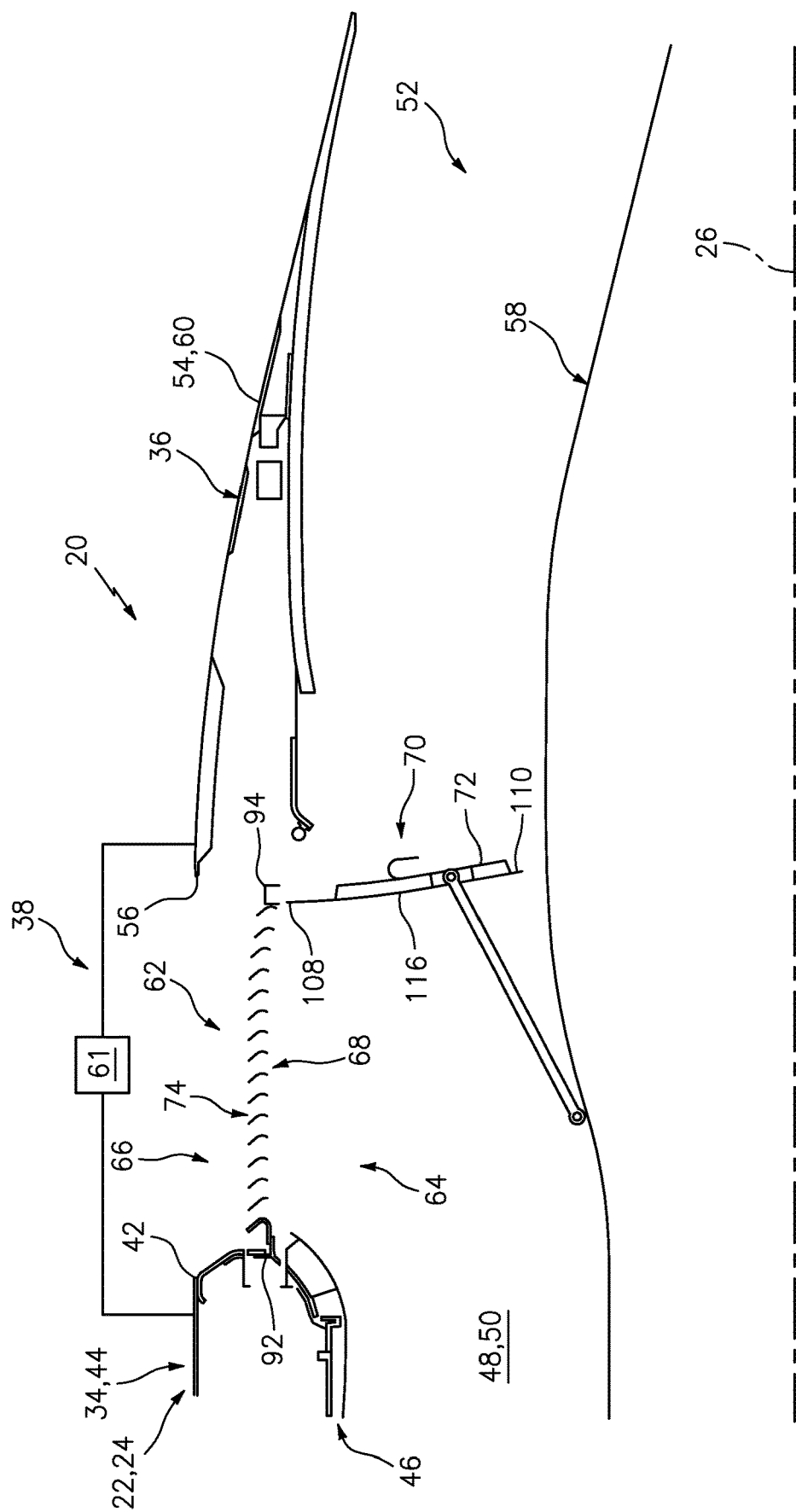
FIG. 4 is a partial side sectional illustration of an aft portion of the aircraft propulsion system with the thrust reverser system in the deployed configuration.
Figure 5:
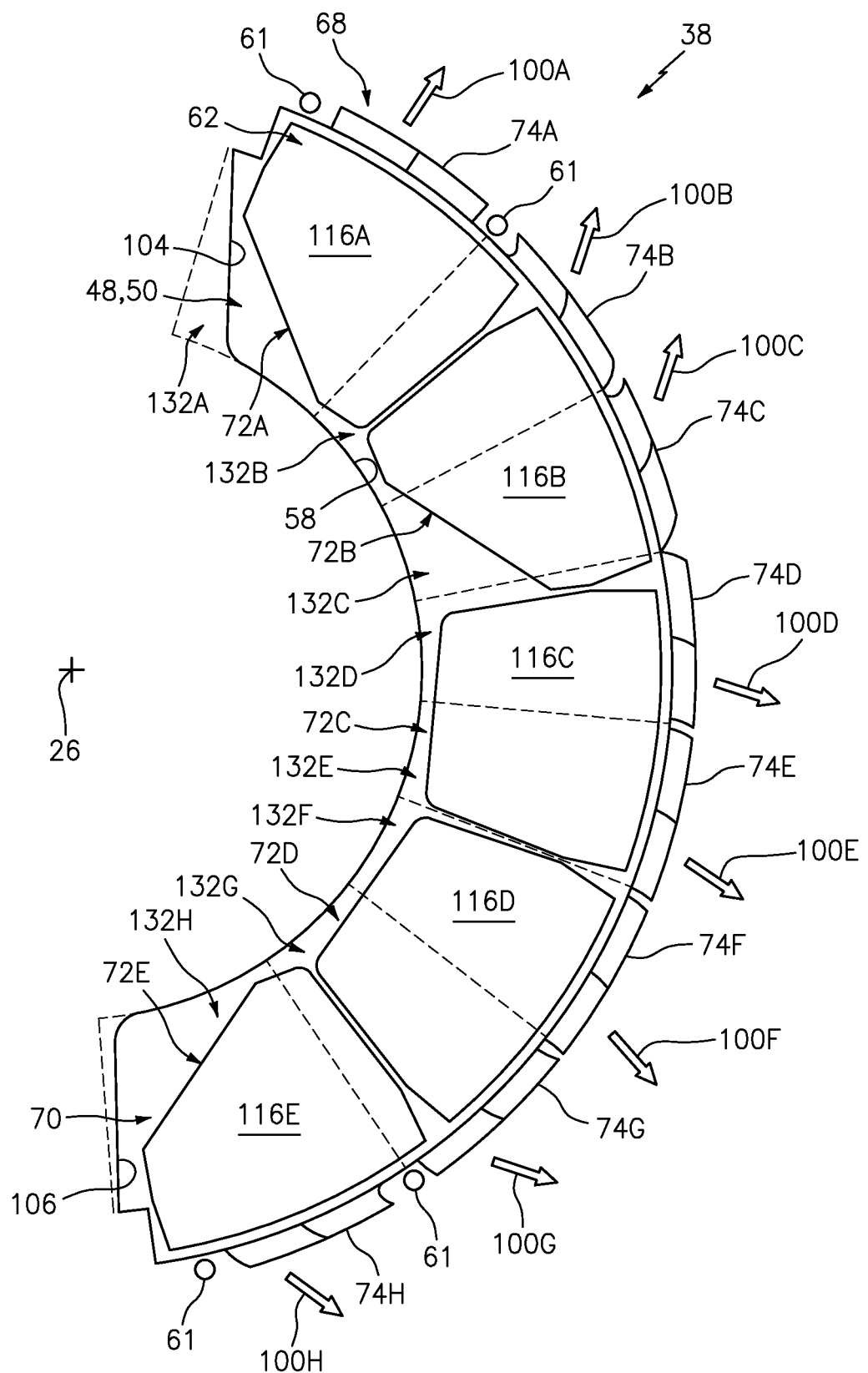
FIG. 5 is a partial cross-sectional illustration of an aft portion of the aircraft propulsion system with the thrust reverser system in the deployed configuration.

Referring to FIGS. 3 and 4, the translating sleeve 54 is configured with (e.g., coupled to) one or more actuators 61 (e.g., linear actuators); see also FIG. 5. These actuators 61 are configured to move the translating sleeve 54 axially along the axial centerline 26 and relative to the stationary portion 44. More particularly, the actuators 61 are configured to axially translate the translating sleeve 54 between a forward stowed position (see FIGS. 1 and 3) where the thrust reverser system 38 is in the stowed configuration and an aft deployed position (see FIGS. 2 and 4) where the thrust reverser system 38 is in a deployed configuration.

In the forward stowed position of FIG. 3, the translating sleeve 54 provides the functionality described above.

In the aft deployed position of FIG. 4, the translating sleeve 54 opens one or more thrust reverser ducts 62 (one visible in FIG. 4). Each of these thrust reverser ducts 62 extends radially through the nacelle outer structure 24 from a respective thrust reverser duct inlet 64 to a respective thrust reverser duct outlet 66. The thrust reverser duct inlet 64 is located radially adjacent the forward thrust duct 48. The thrust reverser duct inlet 64 fluidly couples the respective thrust reverser duct 62 with the forward thrust duct 48 when the thrust reverser system 38 is in its deployed configuration.

In the aft deployed position of FIG. 4, the translating sleeve 54 also uncovers one or more additional components of the thrust reverser system 38. The translating sleeve 54 of FIG. 4, for example, uncovers one or more cascade structures 68 (e.g., cascade halves) (one cascade structure visible in FIGS. 2 and 4). In addition, as the translating sleeve 54 moves from the stowed position to the deployed position, one or more blocker door assemblies 70 (e.g., arcuate arrays of blocker doors 72A-E (generally referred to as "72"); e.g., see FIG. 5) are deployed. Each blocker door assembly 70 is configured to divert the fluid (e.g., fan/compressed air) from the forward thrust duct 48 and its flowpath 50 into a respective one of the thrust reverser ducts 62 and through a respective one of the cascade structures 68 to provide reverse thrust for the propulsion system 20; e.g., direct the fluid out of the propulsion system 20 through the thrust reverser duct outlets 66 generally in an axially forward direction and/or a radially outward direction.

Referring to FIG. 5, each cascade structure 68 includes a plurality of cascade segments 74A-H (generally referred to as "74"). Each of these cascade segments 74 may be configured as a cascade basket. For example, referring to FIG. 6, each cascade segment 74 extends axially along the axial centerline 26 between and to a first (e.g., forward and/or upstream) end 76 and a second (e.g., aft and/or downstream) end 78. Each cascade segment 74 extends laterally (e.g., circumferentially or tangentially) between and to opposing sides 80A and 80B (generally referred to as "80"). Referring to FIG. 7, each cascade segment 74 extends vertically (e.g., radially) between and to a first (e.g., radial inner and/or upstream) side 82 and a second (e.g., radial outer and/or downstream) side 84.

Figure 6:
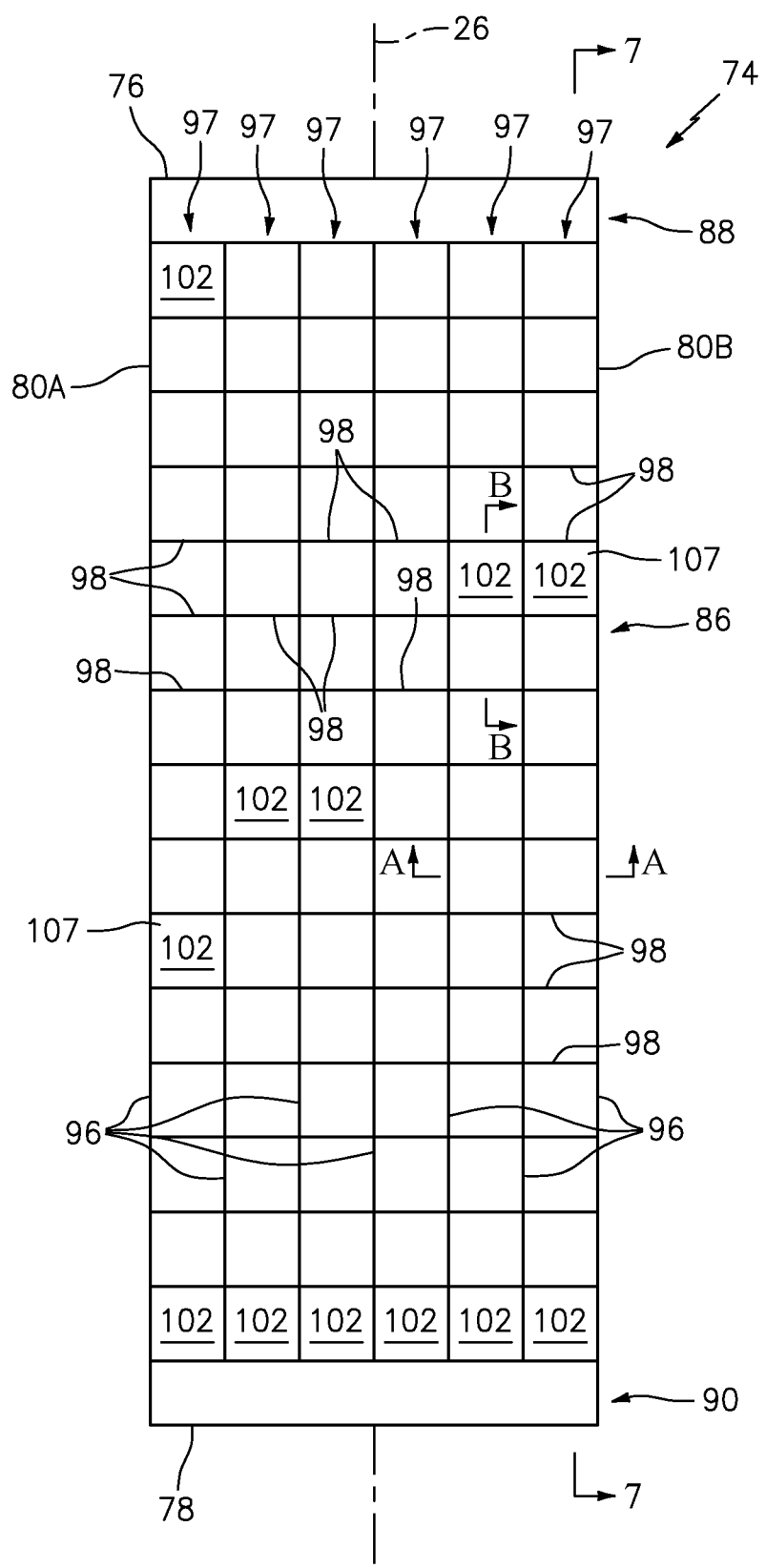
FIG. 6 is an illustration of a cascade segment for the thrust reverser system.
Figure 7:
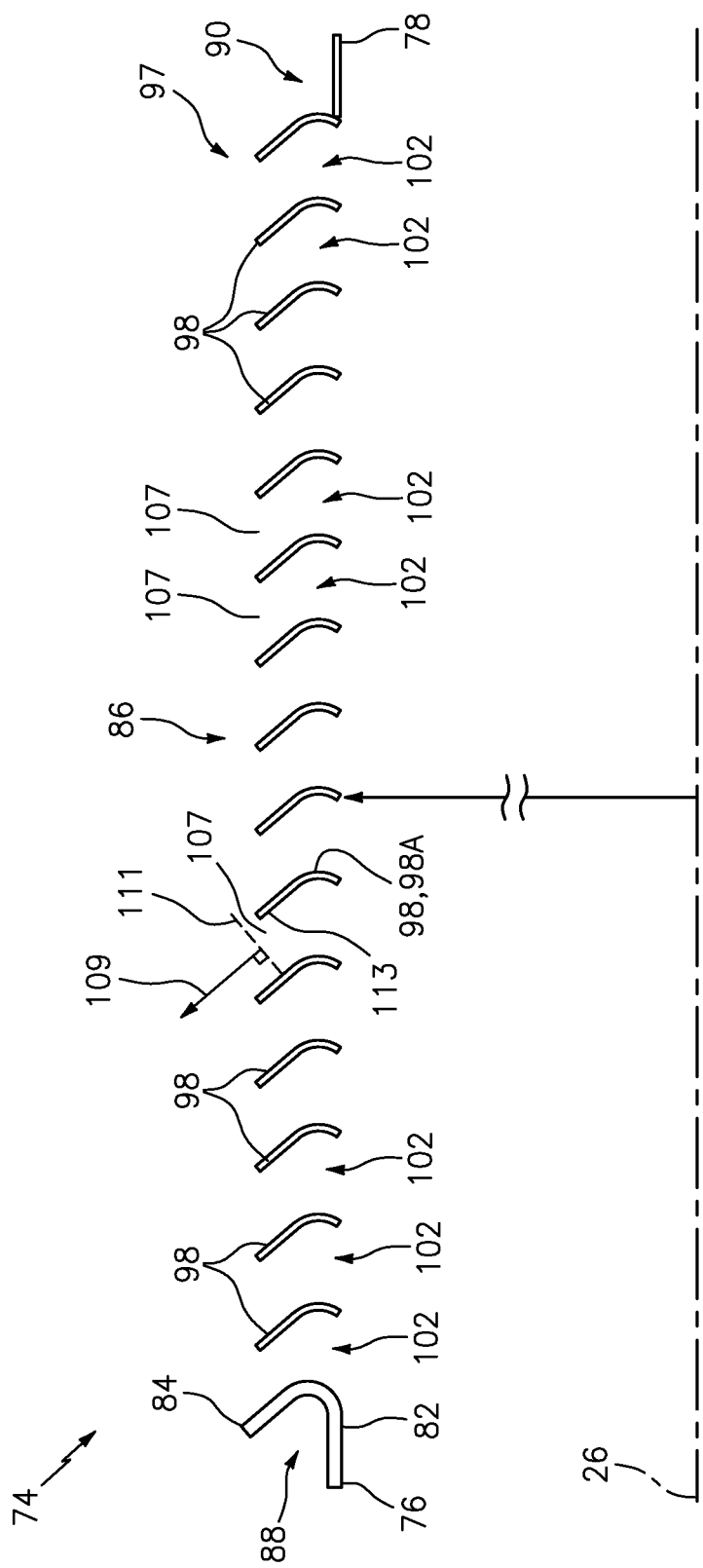
FIG. 7 is a side sectional illustration of the cascade segment taken along line 7-7 in FIG. 6.

The cascade segment 74 of FIGS. 6 and 7 includes a base cascade structure 86 and one or more attachments 88 and 90; e.g., mounting structures. Each of these attachments 88 and 90 is configured to attach/mount the cascade segment 74 and, thus, the respective cascade structure 68 to another structure of the propulsion system 20 such as, but not limited to, a forward structural beam 92 (e.g., the torque box) or an aft cascade ring 94 (see FIG. 4). The attachments 88 and 90 of FIGS. 6 and 7, for example, are configured as attachment flanges. The first (e.g., forward and/or upstream) attachment 88 is arranged at the cascade structure first end 76. The second (e.g., aft and/or downstream) attachment 90 is arranged at the cascade structure second end 78.

Referring to FIG. 6, the base cascade structure 86 includes a plurality of strongback rails 96 and one or more arrays 97 of cascade vanes. The strongback rails 96 of FIG. 6 are arranged parallel with one another. The strongback rails 96 are connected to the attachments 88 and 90. The strongback rails 96 of FIG. 6, for example, extend axially along the axial centerline 26 between and to the cascade attachments 88 and 90.

Figure 8:
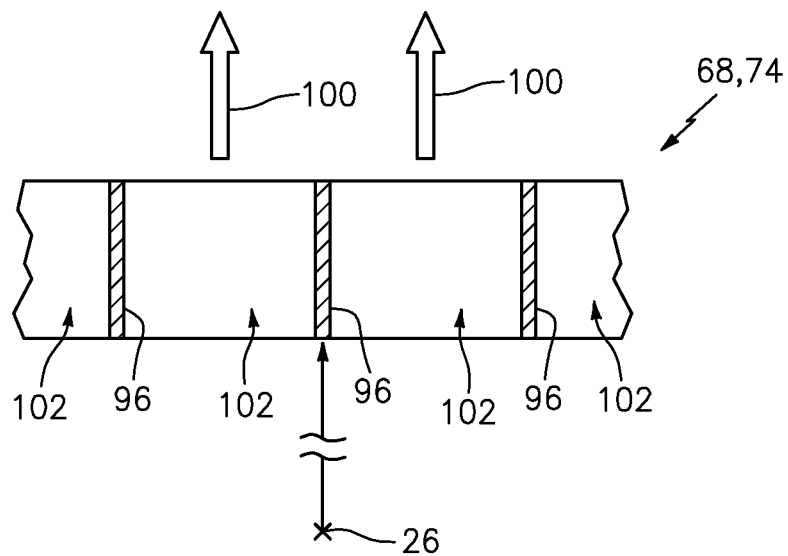
FIG. 8 is a partial sectional illustration of the cascade segment taken along line A-A in FIG. 6, where this cascade segment has strongback rails with first configurations.
Figure 9A:
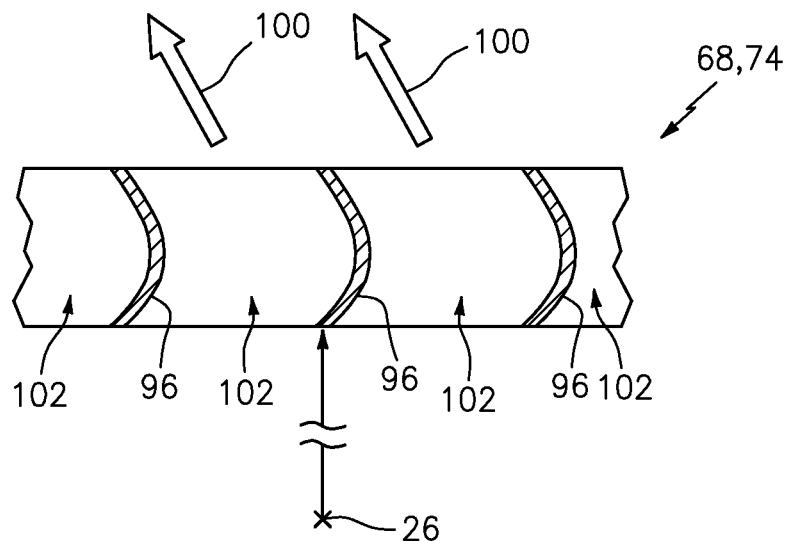
FIG. 9A is a partial sectional illustration of the cascade segment taken along line A-A in FIG. 6, where this cascade segment has strongback rails with second configurations.
Figure 9B:
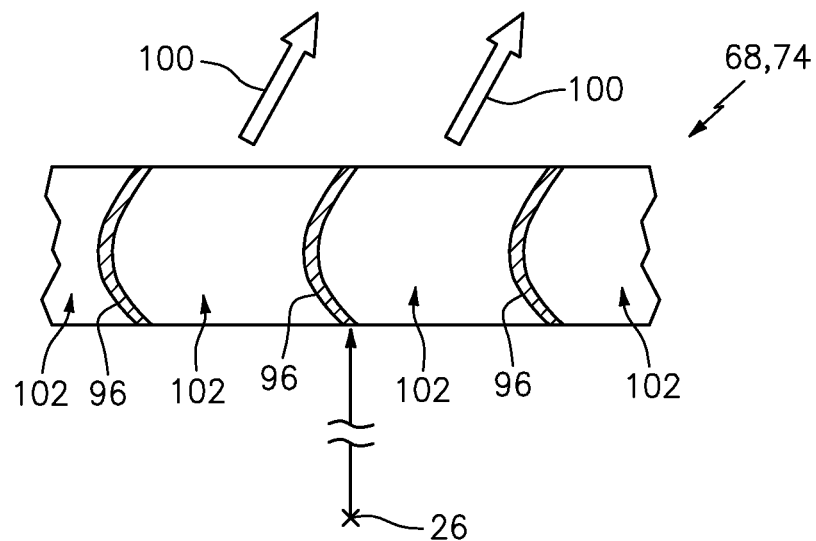
FIG. 9B is a partial sectional illustration of the cascade segment taken along line A-A in FIG. 6, where this cascade segment has strongback rails with third configurations.

Referring to FIG. 8, one or more or each of the strongback rails 96 may have a straight, linear sectional geometry when viewed, for example, in a plane perpendicular to the axial centerline 26; e.g., the plane of FIG. 8. Each strongback rail 96, for example, may extend along a straight, substantially (e.g., completely) radial centerline. With such an arrangement, the respective cascade segment 74 may direct fluid along a radial outward trajectory 100A-H (generally referred to as "100"; see also FIG. 5) with no or a relatively small circumferential component. However, referring to FIGS. 9A and 9B, the cascade segment 74 and one or more or each of its strongback rails 96 may alternatively be configured to direct the fluid in a circumferential direction. The radial outward trajectory 100, more particularly, may have a circumferential component; a clockwise or counter-clockwise component. Each strongback rail 96 of FIGS. 9A and 9B, for example, extends along a non-linear (e.g., curved, arcuate, splined, concave) centerline when viewed, for example, in a plane perpendicular to the axial centerline 26; e.g., the plane of FIGS. 9A and 9B. Of course, in other embodiments, one or more or each of the strongback rails 96 may have a straight centerline that is angularly offset from a radial line.

Referring to FIG. 6, the arrays 97 of cascade vanes are respectively arranged between laterally adjacent strongback rails 96. Each of the arrays 97 of cascade vanes includes a plurality of the cascade vanes 98 (only a select few of which are labeled in FIGS. 6 and 7 for ease of illustration), which cascade vanes 98 are disposed at discrete locations along an axial length of the strongback rails 96. These cascade vanes 98 are configured to turn a flow of fluid (e.g., air) forward, thereby reversing the thrust of the engine fan stream, and aiding in reducing speed (e.g., stopping) of the aircraft. Each axially adjacent pair of vanes 98 forms a respective flow passage 102 axially therebetween. Similarly, each forward-most and/or upstream-most cascade vane 98 forms a respective flow passage 102 with the first attachment 88. Each aftmost and/or downstream-most cascade vane 98 forms a respective flow passage 102 with the second attachment 90. A degree of forward turning may vary between the cascade segments 74A to 74H. For example, the degree of forward turning angle at a bottom of the nacelle (e.g., towards the cascade segment 74H) may be less than the degree of forward turning angle at a top of the nacelle (e.g., towards the cascade segment 74A). An effective flow area of the cascade segment may depend on the forward turning angle.

Each of the cascade vanes 98 is connected to a respective adjacent set of the strongback rails 96. Each cascade vane 98 of FIG. 6, for example, extends laterally between and to a respective adjacent set of the strongback rails 96. Each of the flow passages 102 of FIG. 6 therefore extends laterally between a respective pair of the strongback rails 96.

Figure 10:
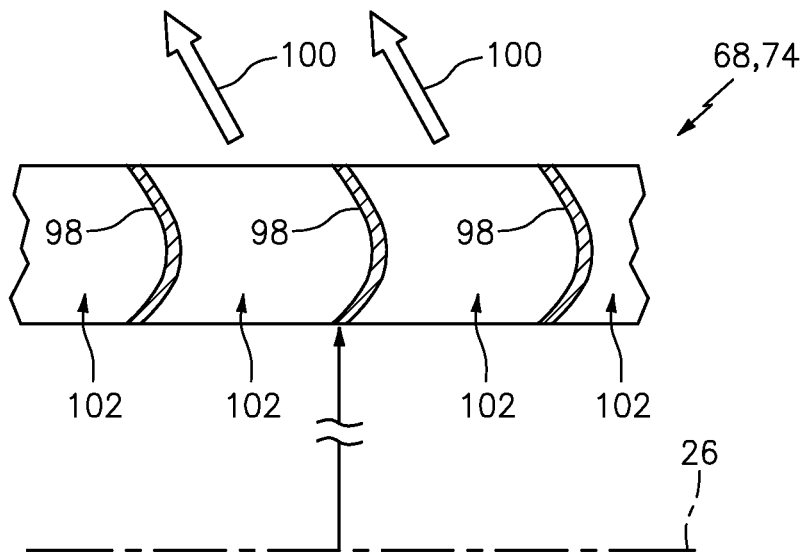
FIG. 10 is a partial sectional illustration of the cascade segment taken along line B-B in FIG. 6, where this cascade segment has cascade vanes with first configurations.
Figure 11:
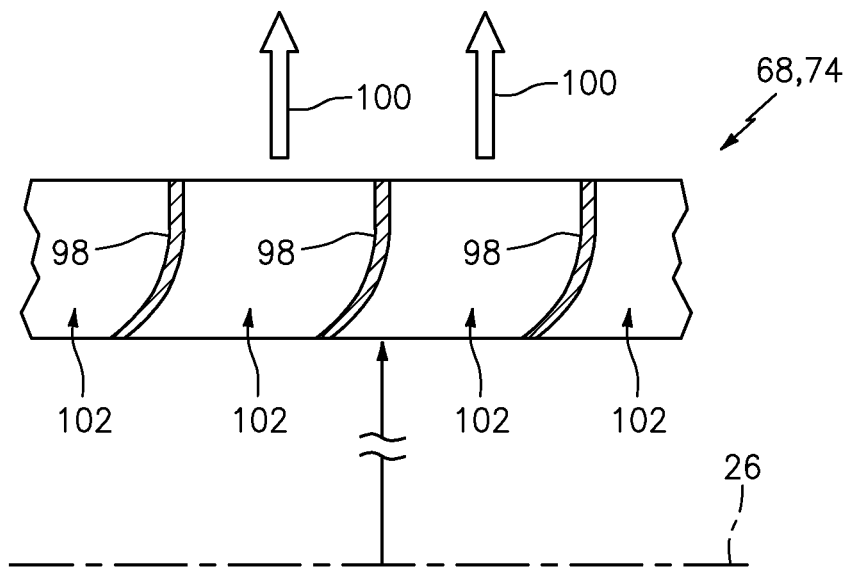
FIG. 11 is a partial sectional illustration of the cascade segment taken along line B-B in FIG. 6, where this cascade segment has cascade vanes with second configurations.

Referring to FIG. 10, one or more or each of the cascade vanes 98 may have a non-linear (e.g., curvilinear) cross-sectional geometry when viewed, for example, in a plane parallel with the axial centerline 26; e.g., the plane of FIG. 10. Each cascade vane 98, for example, may extend along a non-linear (e.g., curved, arcuate, splined, concave) centerline. With such an arrangement, each cascade segment 74 and its cascade vanes 98 may axially redirect the fluid flowing through the respective cascade segment 74. The cascade vanes 98 of FIG. 10, for example, are configured to turn the fluid flowing through the respective cascade segment 74 to provide the radial outward trajectory 100 with an axial forward component. In another example, the cascade vanes 98 of FIG. 11 are configured to turn the fluid flowing through the respective cascade segment 74 to provide the radial outward trajectory 100 with no or a relatively small axial component. The present disclosure, however, is not limited to the foregoing exemplary cascade vane configurations. For example, in other embodiments, the cascade vanes 98 may be configured to provide the radial outward trajectory 100 with an axial aft component that is less than an axial aft component of a trajectory of the fluid entering the respective cascade segment 74 from the forward thrust duct 48.

Referring to FIG. 5, the cascade segments 74 in each cascade structure 68 are arranged circumferentially about the axial centerline 26 in an arcuate array. The cascade segment 74A of FIG. 5 circumferentially neighbors (e.g., is adjacent, abuts, etc.) a first (e.g., upper) bifurcation 104 of the forward thrust duct 48. The cascade segment 74H of FIG. 5 circumferentially neighbors a second (e.g., lower) bifurcation 106 of the forward thrust duct 48. The cascade segments 74B-G are arranged one-by-one around the axial centerline 26 and sequentially between the end cascade segments 74A and 74H.

Each of the cascade segments 74 is configured with a respective cascade segment flow area; e.g., the effective flow area. The term "cascade segment flow area" may describe a total flow area through the respective cascade segment 74. For example, the cascade segment flow area of the cascade segment 74 of FIG. 6 is equal to a sum of the flow areas (e.g., cross-sectional areas) of all the flow passages 102 through that respective cascade segment 74. The flow area of each flow passage 102 may be measured in a lateral (e.g., circumferential or tangential) plane that extends through and/or along the cascade segment 74 and at, for example, an outlet 107 (e.g., an exit) of the respective flow passage 102. Referring to FIG. 7, this plane may be measured normal to a flow direction 109 out of the respective outlet 107; e.g., see plane 111. The flow direction 109 at the outlet 107 is related to the turning angle of a respective cascade vane (e.g., 98A). The flow direction 109 at the outlet 107, for example, may be parallel with a pressure side surface (e.g., 113) of the respective cascade vane (e.g., 98A) at or about the outlet 107. In the specific embodiment of FIG. 5, each of the cascade segments 74 may have the cascade segment flow areas outlined in TABLE 1 below.

| Cascade Segment | Cascade Segment Flow Area | Circumferential Flow component |
|---|---|---|
| Segment 74A | 1.75X to 1.90X | None/radial |
| Segment 74B | 1.30X to 1.50X | First circumferential component |
| Segment 74C | X | First circumferential component |
| Segment 74D | 1.65X to 1.85X | Second circumferential component |
| Segment 74E | 1.65X to 1.85X | Second circumferential component |
| Segment 74F | 1.65X to 1.85X | Second circumferential component |
| Segment 74G | 1.65X to 1.85X | First circumferential component |
| Segment 74H | 1.30X to 1.50X | First circumferential component |

The present disclosure, however, is not limited to the exemplary arrangement and/or ratios of cascade segment flow areas in TABLE 1. For example, in some embodiments, the cascade segment flow area of any one of the cascade segments 74 may be equal to or greater than 1.2X or 1.4X (e.g., as much as or greater than 2.0X), where X is the cascade segment flow area of any other one of the cascade segments 74. In addition or alternatively, the cascade segment flow area of any one of the cascade segments 74 may be equal to or greater than 1.5X or 1.7X, where X is the cascade segment flow area of any other one of the cascade segments 74. The value X may be between fifty square inches (50 in$^2$) and one-hundred and seventy-five square inches (175 in$^2$). Of course, in other embodiments, the value X may be less than fifty square inches (50 in$^2$) or greater than one-hundred and seventy-five square inches (175 in$^2$).

Each of the cascade segments 74A-H of FIG. 5 is configured to direct the fluid along a respective radial outward trajectory 100A-H as described above. The radial outward trajectory 100 associated with any one or more or all of the cascade segments 74 (e.g., the cascade segment 74A) may have little or no circumferential flow component/direction; e.g., see also FIG. 8. In addition or alternatively, the radial outward trajectory 100 associated with any one or more or all of the cascade segments 74 (e.g., the cascade segments 74B, 74C, 74G and 74H) may have a first (e.g., counter-clockwise) circumferential component/direction; e.g., see also FIG. 9A. In addition or alternatively, the outward trajectory 100 associated with any one or more or all of the cascade segments 74 (e.g., the cascade segments 74D-F) may have a second (e.g., clockwise) circumferential component/direction; e.g., see FIG. 9B. The present disclosure, of course, is not limited to the circumferential flow component relationships outlined in TABLE 1. The effective flow area of the cascade segment may also depend on the circumferential turning angle.

Each of the cascade segments 74 of FIG. 5 has a respective cascade segment configuration. This cascade segment configuration is defined by various parameters including, but not limited to: a size (e.g., axial length, lateral width, etc.) of the cascade segment 74; turning angles of the cascade vanes 98 within the cascade segment 74; turning angles of the strongback rails 96 within the cascade segment 74; orientation of the cascade segment 74; etc. Any one or more or all of the foregoing parameters may be the same or different for some or all of the cascade segments 74. More particularly, one or more of the cascade segments 74 may have a common cascade segment configuration. One or more of the cascade segments 74 may also or alternatively have a different (e.g., unique) cascade segment configuration. For example, the cascade segments 74D-F may share a common cascade segment configuration. Each of the cascade segments 74A-C, 74G and 74H may have a unique cascade configuration. The present disclosure, however, is not limited to such an arrangement of cascade segments.

Figure 12:
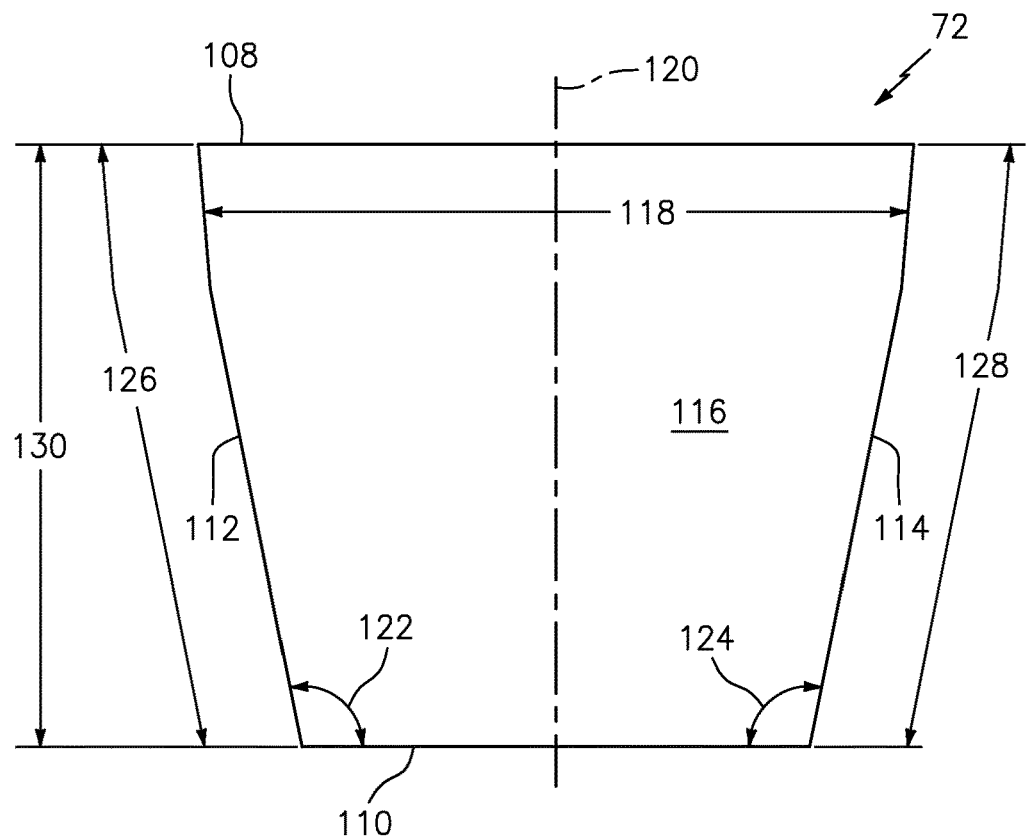
FIG. 12 is an illustration of a blocker door.

The blocker door assembly 70 of FIG. 5 includes the plurality of blocker doors 72. Referring to FIG. 12, each of the blocker doors 72 extends longitudinally between and to a first end 108 and a second end 110. The blocker door first end 108 may be an axially forward end when the respective blocker door 72 is in its stowed position (see FIG. 3) and/or a radial outer end when the respective blocker door 72 is in its deployed position (see FIG. 4). The blocker door second end 110 may be an axially aft end when the respective blocker door 72 is in its stowed position (see FIG. 3) and/or a radial inner end when the respective blocker door 72 is in its deployed position (see FIG. 4). Each blocker door 72 of FIG. 12 extends laterally (e.g., tangentially or circumferentially when stowed) between opposing sides 112 and 114.

Each blocker door 72A-E of FIG. 5 has a blocker door surface 116A-E (generally referred to as "116"). Referring to FIG. 3, this blocker door surface 116 may be configured to partially form the aft outer peripheral boundary of the forward thrust duct 48 and its flowpath 50 when the respective blocker door 72 is in its stowed position. Referring to FIG. 4, the blocker door surface 116 is configured to form a turning surface/a barrier surface within the forward thrust duct 48 and its flowpath 50 when the respective blocker door 72 is in its deployed position. The blocker door surface 116 is thereby operable to redirect a portion of the axially aft flowing fluid within the forward thrust duct 48 radially outward into the respective thrust reverser duct 62 and one or more respective cascade segments 74.

Figure 13:
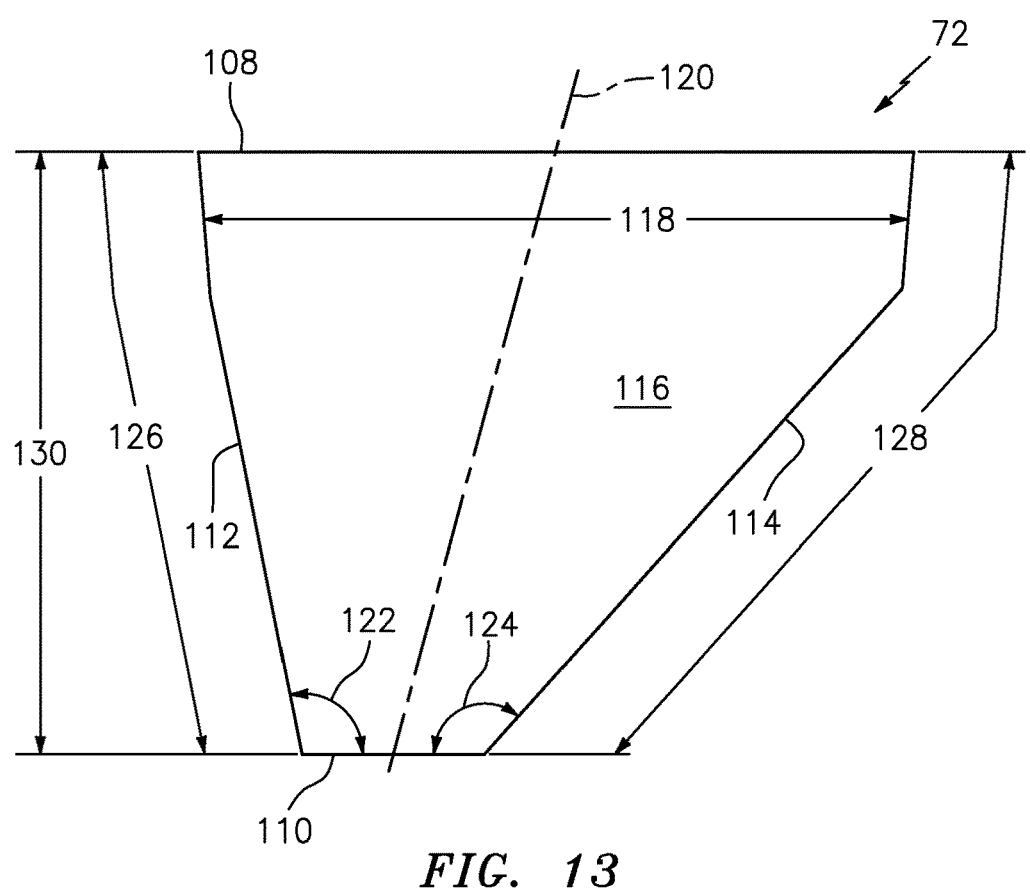
FIG. 13 is an illustration of another blocker door.

The blocker door surface 116 of FIG. 12 is bounded longitudinally by the blocker door first end 108 and the blocker door second end 110. The blocker door surface 116 is bounded laterally by the opposing blocker door sides 112 and 114. At least a portion or an entirety of the blocker door surface 116 may be a tapered surface. A lateral width 118 of the blocker door 72 and its surface 116, for example, may laterally taper as the blocker door 72 and its surface 116 extends longitudinally towards the blocker door second end 110; e.g., from the blocker door first end 108 and/or to the blocker door second end 110. This taper may be symmetrical relative to a longitudinal centerline 120 of the blocker door 72. For example, the blocker door second end 110 and the blocker door first side 112 are angularly offset by an included first angle 122 at, for example, a corner between the blocker door elements 110 and 112. The blocker door second end 110 and the blocker door second side 114 are angularly offset by an included second angle 124 at, for example, a corner between the blocker door elements 110 and 114, where the second angle 124 may be equal to the first angle 122. A length 126 of the blocker door first side 112 may also be equal to a length 128 of the blocker door second side 114. A contour/shape of the blocker door first side 112 may also be the same as a contour/shape of the blocker door second side 114, etc. Alternatively, referring to FIG. 13, the taper may be asymmetrical relative to the longitudinal centerline 120 of the blocker door 72. For example, the second angle 124 may be different (e.g., greater, or less) than the first angle 122. The length 126 of the blocker door first side 112 may also or alternatively be different (e.g., less or greater) than the length 128 of the blocker door second side 114. The contour/shape of the blocker door first side 112 may also or alternatively be the different than the contour/shape of the blocker door second side 114, etc.

Referring to FIG. 12, each of the blocker doors 72 has a blocker door configuration. This blocker door configuration may be defined by various parameters including, but not limited to: surface area and/or perimeter shape of the blocker door surface 116; the lateral width 118 of the blocker door 72 at the blocker door first end 108; the lateral width 118 of the blocker door 72 at the blocker door second end 110; a longitudinal length 130 of the blocker door 72; the contour, the shape and/or the length 126 of the blocker door first side 112; the contour, the shape and/or the length 128 of the blocker door second side 114; the first angle 122; the second angle 124; etc. Any one or more or all of the foregoing parameters may be the same or different for some or all of the blocker doors 72. More particularly, one or more of the blocker doors 72 may have a common blocker door configuration. One or more of the blocker doors 72 may also or alternatively have a different (e.g., unique) blocker door configuration. For example, referring to FIG. 5, the lateral widths at the first (e.g., outer) ends of the blocker doors 72A-72E may be equal. The lateral widths at the second (e.g., inner) ends of the blocker doors 72A, 72B and 72E may be equal. The lateral widths at the second (e.g., inner) ends of the blocker doors 72C and 72D may also be equal, and greater than the lateral widths at the second (e.g., inner) ends of the blocker doors 72A, 72B and 72E. The longitudinal lengths of the blocker doors 72A-72E may be equal. The blocker doors 72A, 72B and 72E may be asymmetric tapered doors, whereas the blocker doors 72C and 72D may be symmetric tapered doors. The first angle of the blocker door 72A may be equal to the second angles of the blocker doors 72C and 72D. The second angle of the blocker door 72A may be equal to the first angles of the blocker doors 72B and 72E. The first angles of the blocker doors 72C and 72D may be equal, and the second angles of the blocker doors 72C and 72D may be equal. See FIGS. 12 and 13 for reference to at least some of the dimensions discussed above.

The blocker doors 72 of FIG. 5 are arranged circumferentially about the axial centerline 26 in an arcuate array. The blocker door 72A of FIG. 5 is laterally (e.g., circumferentially) next to the first bifurcation 104 of the forward thrust duct 48. The blocker door 72E of FIG. 5 is laterally (e.g., circumferentially) next to the second bifurcation 106 of the forward thrust duct 48. The blocker doors 72B-D are arranged one-by-one around the axial centerline 26 and sequentially between the end blocker doors 72A and 72E.

Figure 14:
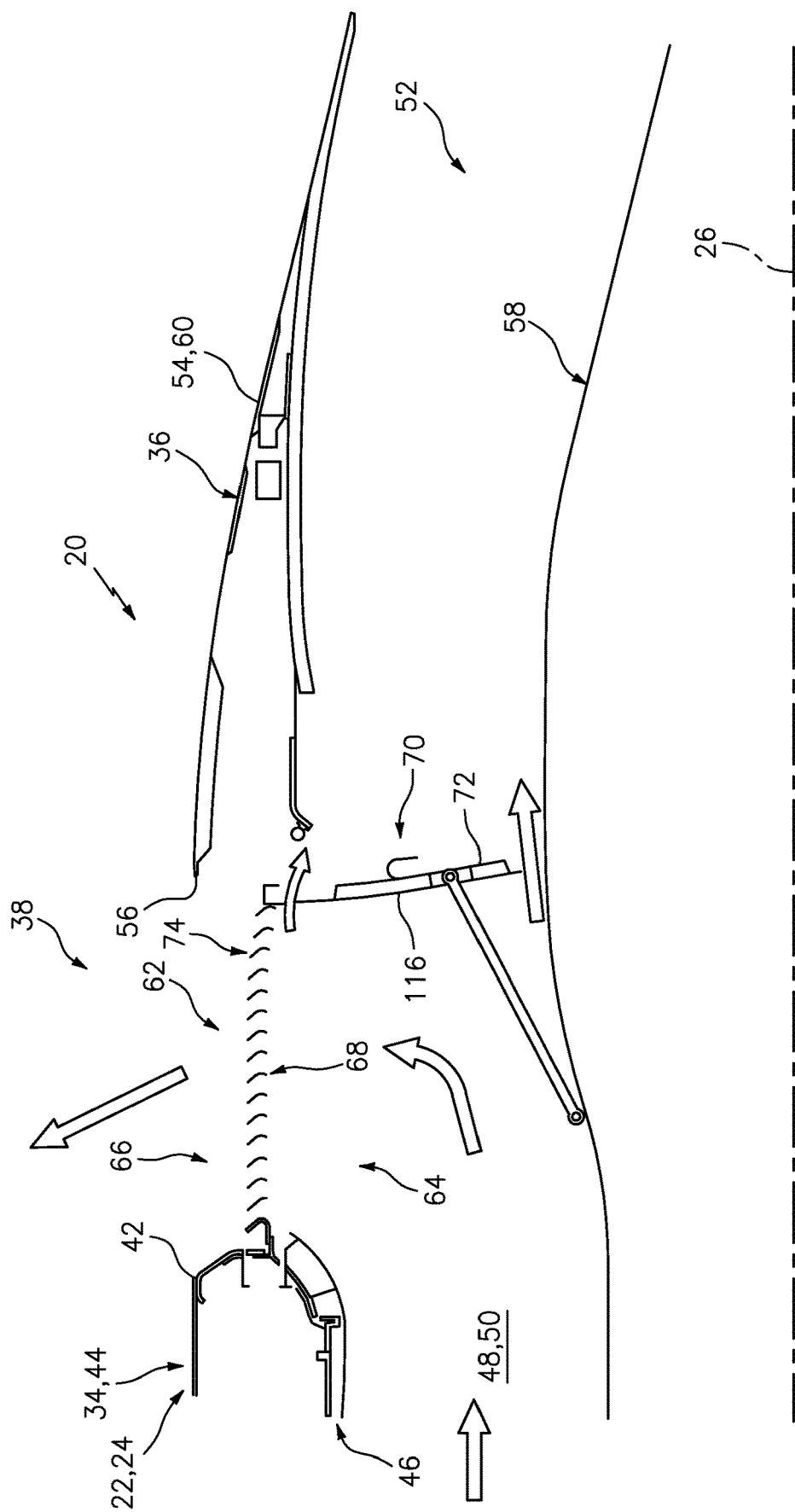
FIG. 14 is a partial side sectional illustration of an aft portion of the aircraft propulsion system with the thrust reverser system in the deployed configuration, where the system is depicted with exemplary fluid flow paths.
Figure 15:
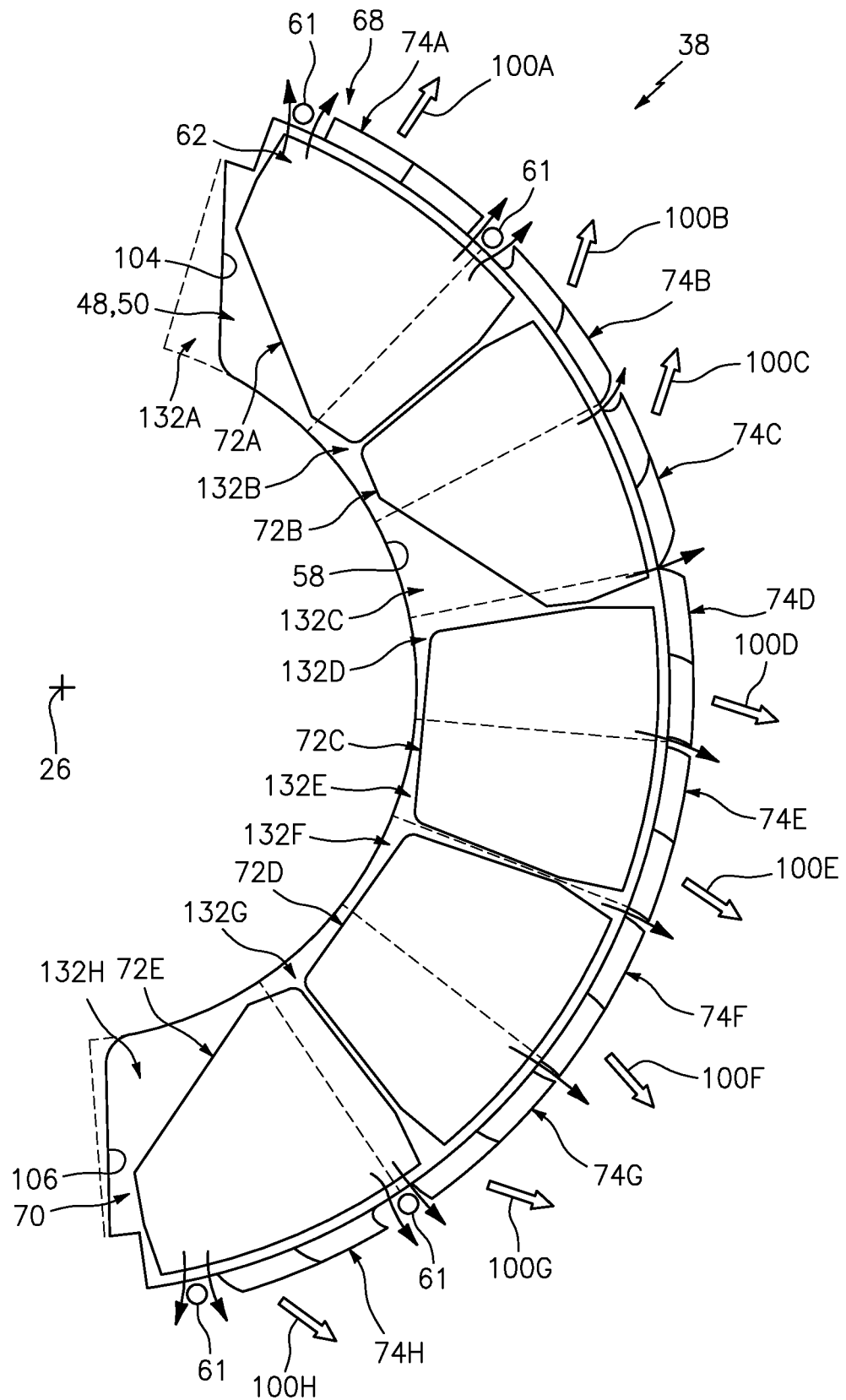
FIG. 15 is a partial cross-sectional illustration of an aft portion of the aircraft propulsion system with the thrust reverser system in the deployed configuration, where the system is depicted with exemplary fluid flow paths.

Referring to FIGS. 3 and 4, each of the blocker doors 72 is configured to move (e.g., pivot radially inward towards the axial centerline 26) from its stowed position (see FIG. 3) to its deployed position (see FIG. 4). In the deployed position of FIG. 4, each blocker door 72 redirects at least some of the fluid from the forward thrust duct 48 into a respective one of the thrust reverser ducts 62 and one or more of the cascade segments 74. More particularly, when the blocker doors 72 of are deployed as shown in FIGS. 14 and 15, a portion (e.g., a majority) of the fluid flowing within the forward thrust duct 48 is redirected into the thrust reverser ducts 62 and through the cascade structures 68 to produce reverse thrust. However, referring to FIG. 15, some fluid may leak past the cascade structures 68. Some of the fluid, for example, may leak around the cascade segments 74A-H; e.g., through gaps between laterally neighboring cascade segments (e.g., between 74A and 74B, between 74B and 74C, etc.) through cavities accommodating the actuators 61, etc. Some additional fluid may also or alternatively leak past each blocker door assembly 70. Some of the fluid, for example, may leak around the blocker doors 72A-E; e.g., through lateral gaps between laterally neighboring blocker doors (e.g., between 72A and 72B, between 72B and 72C, etc.), through respective lateral gaps between blocker doors 72A and 72E and the bifurcations 104 and 106, through radial gaps between the blocker doors 72A-E and nacelle inner structure 58 (see also FIG. 14), through radial gaps between the blocker doors 72A-E and the nacelle outer structure (e.g., the cascade structure 68) (see also FIG. 14), etc.

Each cascade structure 68 is associated with a plurality of lateral sectors 132A-G (e.g., circumferential sectors) (generally referred to as "132") of an assembly. In particular, each cascade segment 74A-H is associated with/defines a respective one of the lateral sectors 132. For example, lateral (e.g., circumferential) bounds of each cascade segment 74 define radial lines to the centerline 26, which radial lines may form lateral bounds of the respective lateral sector 132. Each of these lateral sectors 132 has an effective axial leakage flow area, an effective radial leakage flow area and an effective total flow area. The axial leakage flow area represents a flow area of leakage path(es) about the blocker door assembly 70 (e.g., one or more of the blocker doors 72) within a respective lateral sector 132. The flow area of each axial leakage path may be measured in a plane perpendicular to the axial centerline 26, and/or in a plane normal to the respective axial leakage path. The radial leakage flow area represents a flow area of leakage path(es) about the cascade structure 68 (e.g., a respective one of the cascade segments 74) within a respective lateral sector 132. The flow area of each radial leakage path may be measured in a lateral (e.g., circumferential or tangential) plane that extends through and/or along a respective cascade segment 74 and extends circumferentially about the axial centerline 26, and/or in a plane normal to the respective radial leakage path. The total flow area may be calculated by adding the axial leakage flow area, the radial leakage flow area and the cascade segment flow area for a respective lateral sector 132. Note, any one or more of the axial leakage flow area, the radial leakage flow area and/or the cascade segment flow area may incorporate a respective discharge coefficient to account for various flow properties such as, but not limited to, flow separation. For example, the sum of the axial leakage path flow area(s) (or each flow area) may be multiplied by a respective discharge coefficient to provide the axial leakage flow area.

During thrust reverser system operation, the fluid flowing from the forward thrust duct 48 to the thrust reverser ducts 62 may be subject to primary flows and secondary flows. The term "primary flow" may describe a fluid trajectorial component in an axial or radial direction. For example, the primary flows of the fluid may travel axially within the forward thrust duct 48 and radially within the thrust reverser duct 62. The term "secondary flow" may describe a fluid trajectorial component in a lateral (e.g., circumferential or tangential) direction. For example, secondary flows of the fluid may travel laterally within the forward thrust duct 48 and/or the thrust reverser duct 62. The secondary flows may be generated by a tendency of the fluid to travel along a path of least resistance. For example, where a first of the cascade segments 74 has a greater cascade segment flow area than a neighboring second of the cascade segments 74, some of the fluid laterally aligned with the second cascade segment may have a tendency to turn laterally towards the first cascade segment. Similarly, where leakage passages about a first of the cascade segments 74 and/or a first of the blocker doors 72 are smaller than leakage passages about a neighboring second of the cascade segments 74 and/or a neighboring second of the blocker doors 72, some of the fluid laterally aligned with the first cascade segment and/or the first blocker door may have a tendency to turn laterally towards the second cascade segment and/or the second blocker door. In addition, where one of the cascade segments 74 (e.g., the first cascade segment) is next to a flow impediment and/or a flow diverter such as, but not limited to, one of the bifurcations, some of the fluid laterally aligned with that flow impediment/diverter may have a tendency to turn laterally towards the cascade segment 74 and/or the associated blocker door.

Generation of the secondary flows within the fluid may decrease efficiency of the aircraft propulsion system 20 and, more particularly, the thrust reverser system 38. Therefore, to reduce the generation of the secondary fluid flows and thereby increase thrust reverser efficiency, the thrust reverser system 38 of the present disclosure may be configured such that the total flow areas of at least some of the laterally neighboring lateral sectors 132 are performance matched. An example of such performance matching is outlined below in TABLE 2.

TABLE 2

| Circumferential Sector | Effective Total Flow Area | |
| --- | --- | --- |
| Sector 132A | 185% to 200% of Y | 1.85Y to 2.00Y |
| Sector 132B | 105% to 115% of Y | 1.05Y to 1.15Y |
| Sector 132C | Y | Y |
| Sector 132D | 110% to 120% of Y | 1.10Y to 1.20Y |
| Sector 132E | 105% to 115% of Y | 1.05Y to 1.15Y |
| Sector 132F | 105% to 115% of Y | 1.05Y to 1.15Y |
| Sector 132G | 115% to 125% of Y | 1.15Y to 1.25Y |
| Sector 132H | 150% to 165% of Y | 1.50Y to 1.65Y |

The present disclosure, however, is not limited to the exemplary arrangement and/or ratios of total flow areas in TABLE 2. For example, in some embodiments, the total flow area of any one of the lateral sectors 132 may be within (+/−) five, eight or ten percent (5, 8 or 10%) of Y, where Y is the total flow area of any other one of the lateral sectors 132. In addition or alternatively, the total flow area of any one of the lateral sectors 132 may be within (+/−), fifteen, twenty or twenty-five percent (15, 20 or 25%) of Y, where Y is the total flow area of any other one of the lateral sectors 132.

In the exemplary embodiment of TABLE 2, the total flow areas of the intermediate lateral sectors 132B-G are within (+/−) five, ten, fifteen or twenty percent (5, 10, 15 or 20%) of one another. By contrast, the total flow areas of the end lateral sectors 132A and 132H are more than one-hundred and fifty percent (150%) of the total flow area of one or more of the intermediate lateral sectors 132B-G. This discrepancy in flow areas may be provided such that the end lateral sectors 132A and 132H can accommodate additional fluid flow associated with, for example, the additional fluid laterally diverted into those sectors 132A and 132H by the first and the second bifurcations 104 and 106.

The total flow area of a respective lateral sector 132 can be increased by, for example, decreasing the surface area of a respective blocker door 72 and its blocker door surface 116. For example, the blocker door 72A of FIG. 5 is trimmed to increase the axial leakage flow area thereabout and, thus, increase the total flow area within the respective lateral sector 132A. Conversely, the total flow area of a respective lateral sector 132 can be decreased by, for example, increasing the surface area of a respective blocker door 72 and its blocker door surface 116. For example, the blocker door 72C of FIG. 5 is extended to decrease the axial leakage flow area thereabout and, thus, decrease the total flow area within the respective lateral sector 132D, 132E. The cascade segment flow areas and/or the radial leakage flow areas may also or alternatively be adjusted to provide total flow area performance matching.

Figure 16:
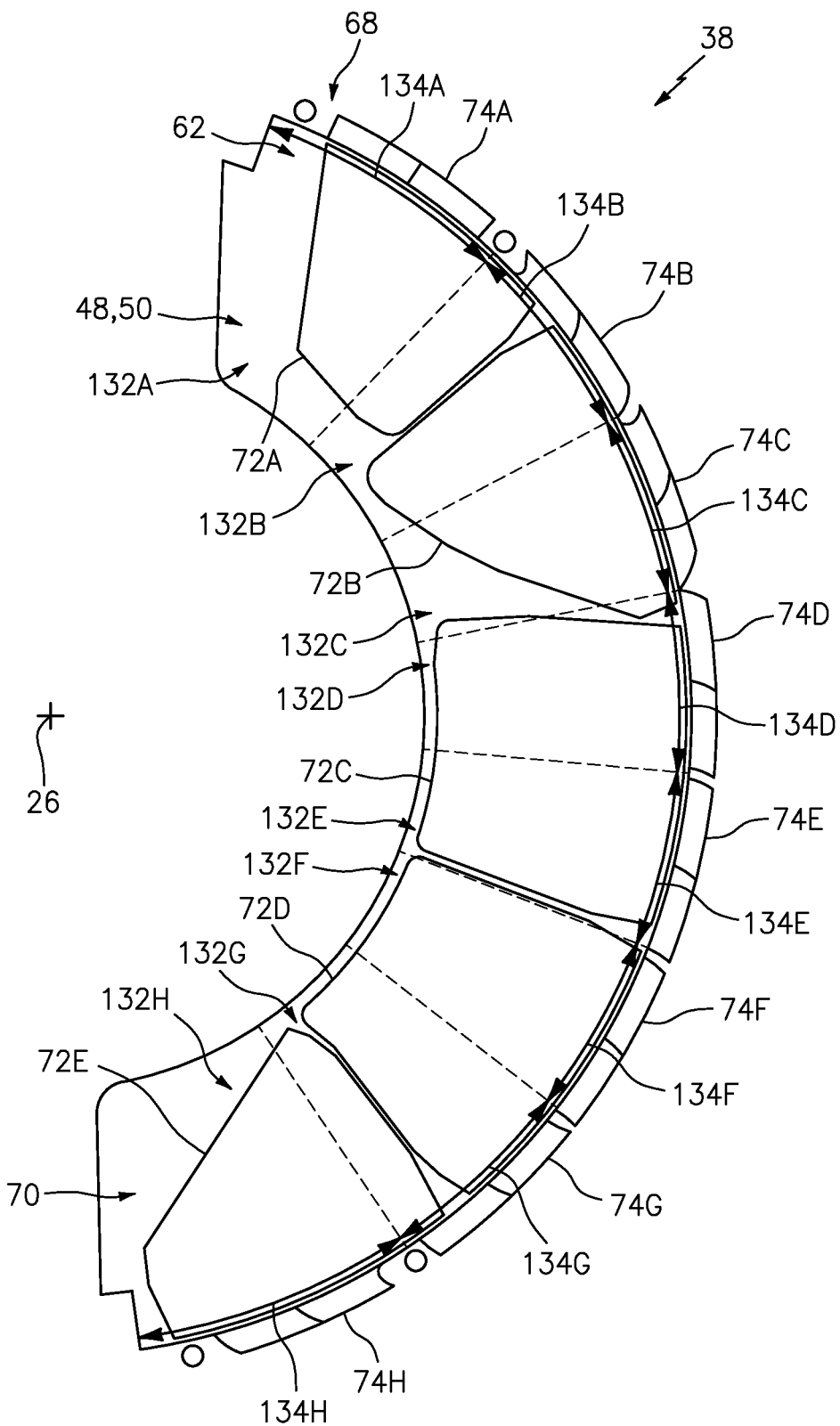
FIG. 16 is a partial cross-sectional illustration of an aft portion of the aircraft propulsion system with thrust reverser system in the deployed configuration, where the thrust reverser system has another arrangement of blocker doors.

FIG. 16 illustrates the blocker door assembly 70 with another arrangement of the blocker doors 72. In the embodiment of FIG. 16, each of the blocker doors 72A-E has a different configuration; e.g., a different shape and/or dimensions. This blocker door assembly 70 may provide even closer performance matching between the total flow areas of the different lateral sectors 132A-H.

Referring to FIG. 16, any one of the lateral sectors 132 (e.g., 132B-G) may have a lateral width 134A-H (generally referred to as "134") (e.g., circumferential width) that is substantially equal to the lateral width 134 of any other one of the lateral sectors 132 (e.g., 132B-G). The lateral widths 134 of some or all of the lateral sectors 132 (e.g., 132B-G), for example, may be exactly or approximately (e.g., +/−2%) equal to one another. Alternatively, the lateral width 134 of any one or more of the lateral sectors 132 (e.g., 132B-G) may be different than the lateral width 134 of any other one or more of the lateral sectors 132 (e.g., 132A, 132H).

While the gas turbine engine is generally described above as a turbofan turbine engine, the present disclosure is not limited to such an exemplary gas turbine engine configuration. For example, in other embodiments, the gas turbine engine may alternatively be configured as a turbojet gas turbine engine where, for example, the forward thrust duct 48 is configured as a core duct and/or an exhaust duct rather than a bypass duct. The present disclosure therefore is not limited to any particular gas turbine engine types or configurations. Furthermore, the present disclosure is not limited to a translating sleeve type thrust reverser.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
 a forward thrust duct; and a thrust reverser system comprising a thrust reverser duct, a blocker door assembly and a cascade structure;

the blocker door assembly configured to redirect fluid flowing through the forward thrust duct into the thrust reverser duct;

the cascade structure including a plurality of cascade segments within the thrust reverser duct, the plurality of cascade segments including a first cascade segment and a second cascade segment, the first cascade segment having a first cascade segment flow area and associated with a first lateral sector of the assembly, and the second cascade segment having a second cascade segment flow area and associated with a second lateral sector of the assembly, wherein the second cascade segment flow area is at least 1.2 times the first cascade segment flow area;

the first lateral sector of the assembly having a first axial leakage flow area, a first radial leakage flow area and a first total flow area, and the first total flow area equal to a sum of the first cascade segment flow area, the first axial leakage flow area and the first radial leakage flow area, wherein the first axial leakage flow area is a flow area for axial flow around the blocker door assembly within the first lateral sector of the assembly, and the first radial leakage flow area is a flow area for radial flow around the first cascade segment within the first lateral sector of the assembly; and the second lateral sector of the assembly having a second axial leakage flow area, a second radial leakage flow area and a second total flow area, and the second total flow area equal to a sum of the second cascade segment flow area, the second axial leakage flow area and the second radial leakage flow area, wherein the second axial leakage flow area is a flow area for axial flow around the blocker door assembly within the second lateral sector of the assembly, the second radial leakage flow area is a flow area for radial flow around the second cascade segment within the second lateral sector of the assembly, and the second total flow area is within ten percent of the first total flow area.

2. The assembly of claim 1, wherein the second cascade segment flow area is at least 1.4 times the first cascade segment flow area.

3. The assembly of claim 1, wherein the second total flow area is within eight percent of the first total flow area.

4. The assembly of claim 1, wherein the first lateral sector of the assembly circumferentially neighbors the second lateral sector of the assembly.

5. The assembly of claim 1, wherein
the plurality of cascade segments further include a third cascade segment, and the third cascade segment has a third cascade segment flow area and is associated with a third lateral sector of the assembly;
the third lateral sector of the assembly has a third axial leakage flow area about the blocker door assembly, a third radial leakage flow area about the cascade structure, and a third total flow area equal to a sum of the third cascade segment flow area, the third axial leakage flow area and the third radial leakage flow area; and
the third total flow area is within ten percent of the first total flow area.

6. The assembly of claim 1, wherein
the blocker door assembly includes a first blocker door and a second blocker door;
the first blocker door is partially within the first lateral sector of the assembly and has a first configuration; and
the second blocker door is partially within the second lateral sector of the assembly and has a second configuration that is different than the first configuration.

7. The assembly of claim 6, wherein
the first blocker door and the second blocker door are arranged about an axial centerline;
the first blocker door has a first shape when viewed in a plane perpendicular to the axial centerline; and
the second blocker door has a second shape that is different than the first shape when viewed in the plane perpendicular to the axial centerline.

8. The assembly of claim 6, wherein
the first blocker door has a first longitudinal length; and
the second blocker door has a second longitudinal length that is different than the first longitudinal length.

9. The assembly of claim 6, wherein
the first blocker door has a first lateral width; and
the second blocker door has a second lateral width that is different than the first lateral width.

10. The assembly of claim 9, wherein at least one of
the second cascade segment flow area is at least 1.7 times the first cascade segment flow area; or
the second total flow area is within fifteen percent of the first total flow area.

11. The assembly of claim 9, wherein
the plurality of cascade segments further include a third cascade segment, and the third cascade segment has a third cascade segment flow area and is associated with a third lateral sector of the assembly;
the third lateral sector of the assembly has a third axial leakage flow area, a third radial leakage flow area and a third total flow area, and the third total flow area equal to a sum of at least the third cascade segment flow area, and the third leakage flow area and the third radial leakage flow area;
the third axial leakage flow area is a flow area for axial flow around the blocker door assembly within the third lateral sector of the assembly;
the third radial leakage flow area is a flow area for radial flow around the third cascade segment within the third lateral sector of the assembly; and
the third total flow area is within twenty percent of the first total flow area.

12. The assembly of claim 1, wherein
the first cascade segment and the second cascade segment are arranged circumferentially about an axial centerline;
the thrust reverser system is configured to direct fluid out of the first cascade segment in a first circumferential direction about the axial centerline; and
the thrust reverser system is configured to direct fluid out of the second cascade structure in a second circumferential direction about the axial centerline that is different than the first circumferential direction about the axial centerline.

13. The assembly of claim 1, wherein
the blocker door assembly includes a plurality of blocker doors;
the plurality of blocker doors are arranged circumferentially about an axial centerline, the blocker doors are configured to redirect the fluid into the thrust reverser duct when in a deployed position, and the plurality of blocker doors include a first blocker door, a second blocker door and a third blocker door;
the first blocker door has a first configuration;
the second blocker door has a second configuration that is different than the first configuration; and the third blocker door has a third configuration that is different than the first configuration and the second configuration.

14. The assembly of claim 13, wherein
the second blocker door is circumferentially between and neighbors the first blocker door and the third blocker door;
the first blocker door has a first shape;
the second blocker door has a second shape that is different than the first shape; and
the third blocker door has a third shape that is different than the first shape and the second shape.

15. An assembly for an aircraft propulsion system, comprising:
a forward thrust duct; and
a thrust reverser system comprising a thrust reverser duct, a blocker door assembly and a cascade structure;
the blocker door assembly configured to redirect fluid flowing through the forward thrust duct into the thrust reverser duct;
the cascade structure including a plurality of cascade segments within the thrust reverser duct, the plurality of cascade segments including a first cascade segment and a second cascade segment, the first cascade segment having a first cascade segment flow area and associated with a first lateral sector of the assembly, and the second cascade segment having a second cascade segment flow area and associated with a second lateral sector of the assembly, wherein the second cascade segment flow area is at least 1.5 times the first cascade segment flow area;
the first lateral sector of the assembly having a first axial leakage flow area, a first radial leakage flow area and a first total flow area, and the first total flow area equal to a sum of the first cascade segment flow area, the first axial leakage flow area and the first radial leakage flow area, wherein the first axial leakage flow area is a flow area for axial flow around the blocker door assembly within the first lateral sector of the assembly, and the first radial leakage flow area is a flow area for radial flow around the first cascade segment within the first lateral sector of the assembly; and
the second lateral sector of the assembly having a second axial leakage flow area, a second radial leakage flow area and a second total flow area, and the second total flow area equal to a sum of at least the second cascade segment flow area, the second leakage flow area, and the second radial leakage flow area, wherein the second axial leakage flow area is a flow area for axial flow around the blocker door assembly within the second lateral sector of the assembly, the second radial leakage flow area is a flow area for radial flow around the second cascade segment within the second lateral sector of the assembly, and the second total flow area is within twenty percent of the first total flow area.

\* \* \* \* \*